US006763724B2

(12) United States Patent
DiPaola et al.

(10) Patent No.: US 6,763,724 B2
(45) Date of Patent: Jul. 20, 2004

(54) HERMETIC PRESSURE TRANSDUCER

(75) Inventors: David J. DiPaola, Attleboro, MA (US); Hidde Walstra, GL Almelo (NL); Timothy J. Breitenbach, Cumberland, RI (US); Peter A. Weise, Attleboro, MA (US)

(73) Assignee: Texas Instruments Incorporated, Dallas, TX (US)

( * ) Notice: Subject to any disclaimer, the term of this patent is extended or adjusted under 35 U.S.C. 154(b) by 16 days.

(21) Appl. No.: 10/341,297

(22) Filed: Jan. 13, 2003

(65) Prior Publication Data

US 2004/0007074 A1 Jan. 15, 2004

Related U.S. Application Data

(60) Provisional application No. 60/394,949, filed on Jul. 10, 2002.

(51) Int. Cl.[7] ................................................. G01L 9/00
(52) U.S. Cl. ........................................................ 73/717
(58) Field of Search ........................... 73/715–727, 706, 73/714, 756; 252/502, 512; 442/6, 117

(56) References Cited

U.S. PATENT DOCUMENTS

| 6,344,155 B1 | * | 2/2002 | Kitahara et al. | ............. | 252/502 |
| 6,453,747 B1 | | 9/2002 | Weise et al. | | |
| 6,672,170 B1 | * | 1/2004 | DiPaola | .................... | 73/717 |

* cited by examiner

*Primary Examiner*—William Oen
(74) *Attorney, Agent, or Firm*—Russell E. Baumann; Frederick J. Telecky, Jr.

(57) ABSTRACT

A port fitting is formed with a closed, pedestal end forming a diaphragm on which a strain gauge sensor is mounted. A support member is received on the pedestal end and is formed with a flat end wall having an aperture aligned with the sensor. A portion of a flexible circuit assembly is bonded to the flat end wall with a connector disposed over the support member. A tubular outer housing is fitted over the several components and its bottom portion is welded to the port fitting while its top portion places a selected load on an O-ring received about the connector as well as internal components of the transducer. In one embodiment, a loading washer (72a) is disposed over the O-ring on a first portion (70a) of a two portion connector (70) and retained by a second connector portion (70b). Protrusions (76a1) formed on the tubular housing (76) pass through cut-outs in the second connector portion to place a load on the loading washer. To facilitate assembly, the connector is attachable to the support member in one embodiment by legs of an EMC shield (74), with the shield coupled to the connector by wedging tabs (74c6) and in another embodiment by direct engagement of legs of the connector. In one embodiment a shroud (92) is removably received on the connector to protect elongated terminals extending therefrom. One embodiment is provided with an enhanced environmental seal including a resilient grommet (112) retained by a snap cap (114).

9 Claims, 19 Drawing Sheets

HERMETIC PRESSURE TRANSDUCER

RELATED APPLICATIONS

This application claims priority under 35 USC §119(e) (1) of provisional application No. 60/394,949, filed Jul. 10, 2002.

Copending application Ser. No. 09/723,139, filed Nov. 27, 2000 and application Ser. Nos. 10/341,295, 10/341,298 filed of even date and assigned to the assignee of the present invention contain subject matter similar to that contained herein.

FIELD OF THE INVENTION

This invention relates generally to pressure transducers and more particularly to such transducers using strain gauge technology for sensing pressure change to produce an electrical signal related to such change and employing electronics for processing and amplifying the signal.

BACKGROUND OF THE INVENTION

Although the use of strain gauge technology for converting changes in fluid pressure to related electrical signals is known, there exists a need to provide transducers which are more easily manufacturable and which have improved reliability and optimum life expectancy. There is also a need to minimize the cost of producing the transducers so as to make it more economically feasible to use them in given applications and thus increase manufacturing volume with resulting savings in large volume manufacturing techniques.

In copending application Ser. No. 09/723,139, assigned to the assignee of the present invention, a pressure transducer using strain gauge technology is disclosed and claimed comprising a tubular port fitting having a fluid receiving opening at one end and a closed, integrally formed diaphragm at an opposite pedestal end, an angular orientation feature and a locking feature for locking receipt of a support member on the pedestal end. The support member has an apertured flat end wall received over the diaphragm portion, the aperture being in alignment with strain gauge sensor elements glass bonded to the diaphragm portion. A flexible circuit assembly having a first lobe section for mounting electronic components is bonded to the rigid, flat end surface of the support with an opening aligned with the aperture in the flat surface. A second lobe section of the flexible circuit assembly is positioned on a seating surface of a connector mounted on the support member, the connector mounting terminals with free distal ends extending into an electronics chamber in which the seating surface is disposed. The free distal ends are received through apertures in the second lobe section and soldered to respective circuit pads thereon. Wires are ultrasonically bonded both to the strain gauge sensor elements and to circuit pads on the bonded lobe section of the flexible circuit assembly and encapsulated by silicone gel.

In a first embodiment, a cup-shaped EMC shield is received in the electronics chamber over the first lobe section of the flexible circuit assembly, the shield provided with tabs which extend outwardly through openings in the connector's sidewall beyond the outer periphery of the connector's walls. An intermediate portion of the flexible circuit assembly extending between the lobe sections is bent into a generally U-shaped configuration with wall portions of the connector locking onto the support member. An hexagonal metal housing member is received over the body of the connector with the EMC shield tabs spring biased into electrical connection with the housing member and with the housing member applying a selected load on an O-ring placed in a circumferentially extending groove formed in the sidewall of the connector body, the housing being welded around its lower periphery to a support flange of the port fitting to form a fluid seal and to maintain the loading on the O-ring.

In a second embodiment made especially for miniaturization, the connector has an elongated portion mounting terminals having spaced apart circumferentially extending contact portions. A ground ring is mounted on an external surface of the connector and the housing is formed with radially extending tabs at one end which are biased into electrical engagement with the ground ring when the housing is welded to the port fitting.

SUMMARY OF THE INVENTION

It is an object of the invention to provide an environmentally sealed pressure transducer which is particularly conducive to ease of assembly with minimal chance of misalignment of components during assembly which could cause damage to sensitive components within the transducer. Another object of the invention is the provision of a transducer with optimized yield and life expectancy. Another object is the provision of a transducer having elongated free length terminals for use with selected welded connections to terminals of ancillary equipment and for means to prevent bending of such terminals during assembly, handling and shipping. Yet another object is the provision of an improved environmental seal including a seal particularly adapted for use in harsh environmental conditions. Still another object is the provision of a transducer having improved reliability of electrical connections between an EMC shield and a ground conductor.

Briefly described, the pressure transducer made in accordance with a preferred embodiment of the invention includes a vertical stack of components of the type disclosed in the above referenced copending application including a tubular port fitting having a diaphragm at a pedestal end with strain gauge sensor elements mounted on the diaphragm, a support member having an end wall formed with a sensor element receiving window formed in the end wall, the support member mounted on the tubular port fitting, an electrically insulative connector mounting terminals received over the support member forming an electronic chamber between the support member and the connector and with a flexible circuit assembly bent into a U-shaped configuration received in the electronic chamber. An EMC shield having terminal receiving apertures has an end wall disposed between the connector and the flexible circuit and is connected to the connector by spring tabs wedged against sidewalls of a slot in the connector. The shield is formed with first and second legs, the first legs having at their distal free ends a foot extending out of the plane of the respective first legs adapted to be biased into engagement with a ground conductor of the flexible circuit assembly. The second legs have a catch and an outwardly extending cam portion at their distal free ends for being cammed outwardly when pressed against the outer periphery of the support member until the catch is received in a window formed in the support member thereby interconnecting the connector/EMC shield sub-assembly and the support member with the first legs of the shield being in engagement with the ground conductor of the flexible circuit assembly. The interconnection of the second legs of the EMC shield and the support member facilitates the proper alignment of the vertical stack of components during the assembly process, i.e., until a later assembled O-ring applies a compressive force on the stack.

According to a feature of the above embodiment, the connector comprises first and second separate body portions with an O-ring received on the first portion and a loading washer disposed over the O-ring. The second connector portion has a central hub receivable in a cavity of the first portion with a plurality of terminals extending through the central hub and down through bosses of the first connector portion and through the apertures in the EMC shield. The second connector portion is ultrasonically welded to the first portion and has an end wall retaining the O-ring and washer with the end wall formed with cut-out portions about its outer periphery so that protrusions formed on a housing can pass through the cut-outs and apply a suitable load on the O-ring through the washer. The load on the washer is applied and maintained by attaching the housing to the tubular port fitting as by welding. The washer serves to evenly distribute forces on the O-ring and prevent localized over-compression in the O-ring.

In another embodiment, an EMC shield in the form of a ring is insert molded into the connector with the ring having an exposed upper, radially extending surface forming an O-ring seat. The connector is formed with downwardly extending legs formed with a catch receivable in respective windows formed in the support member for positive attachment thereto. A tubular housing member is formed with an annular flange at an end thereof which serves to apply a loading force to an O-ring disposed on the seat to provide an environmental seal as well as to maintain a compressive force on the stack of vertically aligned components.

According to a feature of this embodiment, terminals extending through the connector may be provided with an extended free length portion to facilitate welding to an ECU unit or the like. A shroud is provided with terminal receiving grooves or bores removably interconnected with the connector to protect the terminals and prevent bending of the terminals during assembly, handling and shipping.

In another embodiment, a transducer particularly adapted for use when exposed to harsh environments comprises a connector having an elongated tubular neck in which a well is formed. An insulative insert having lead receptacle bores formed therein is received in the well. The insert supports a resilient grommet retained in the well by a snap cap. The grommet is a generally cylindrical member having longitudinally extending through holes for wires extending from the receptacles, a center gland extending around the outer cylindrical periphery and a plurality of cylindrical protrusions extending downwardly from the bottom face to provide space relief and avoid over-compression. Wire leads connected to the terminals within the insulative insert provide orientation insensitivity.

Additional objects, features and methods of the invention will be set forth in part in the description which follows and in part will be obvious from the description. The objects and advantages of the invention may be realized and attained by means of the instrumentalities, combinations and methods particularly pointed out in the appended claims.

BRIEF DESCRIPTION OF THE DRAWINGS

The accompanying drawings which are incorporated in and constitute a part of the specification, illustrate preferred embodiments of the invention and, together with the description, serve to explain the objects, advantages and principles of the invention. In the drawings.

DETAILED DESCRIPTION OF THE PREFERRED EMBODIMENTS

Figure 1:
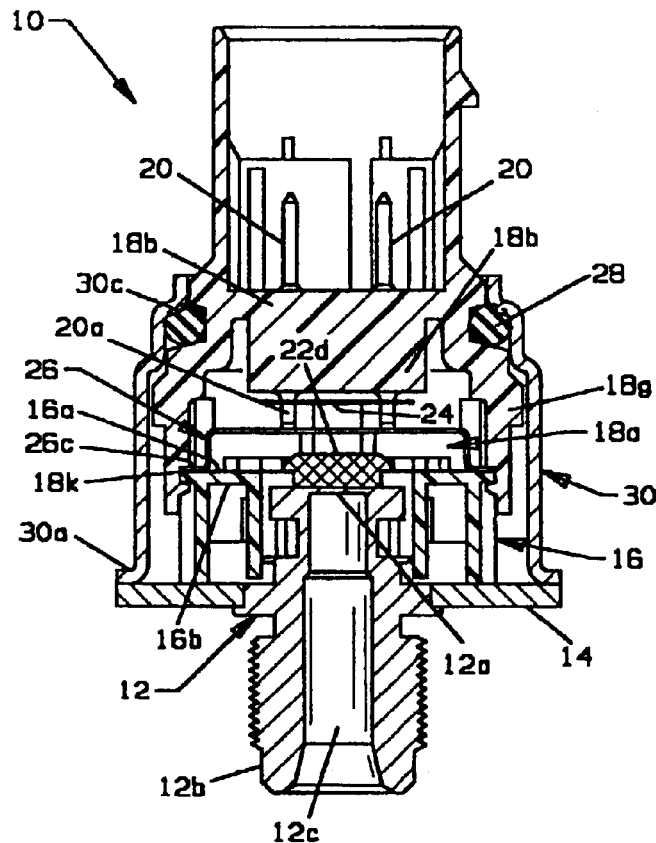
FIG. 1 is a cross-sectional view taken on line 1—1 of FIG. 1(a) of a transducer made in accordance with copending application Ser. No. 09/723,139.
Figure 1A:
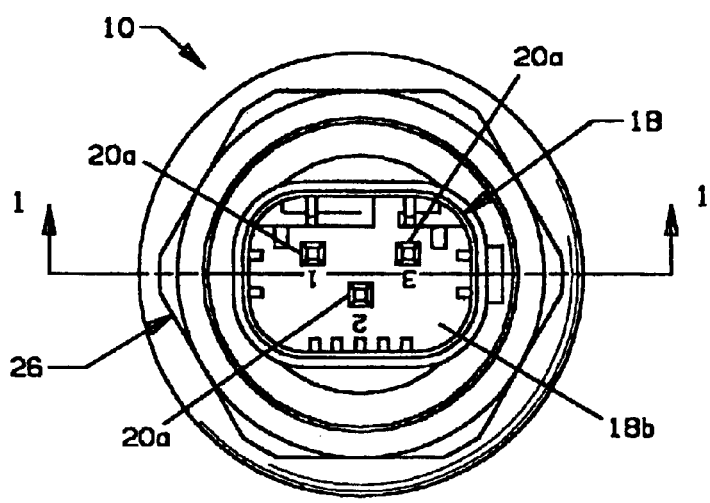
FIG. 1(a) is a top plan view of the FIG. 1 transducer.

As shown in copending application Ser. No. 09/723,139, FIGS. 1 and 1(a) show an assembled pressure transducer 10 comprising a metallic tubular port fitting 12 having a first closed pedestal end with an integrally formed diaphragm portion 12a, and an elongated, open, coupling end 12b. A support flange 14 is fixedly attached to the port fitting as by hermetically welding thereto intermediate to the pedestal end and the coupling end. A support member 16 is disposed over the pedestal end and received on the support flange. The support member 16 is provided with an end wall 16a having a flat surface 16b formed with an aperture 16c therethrough aligned with a central portion of the diaphragm portion. A connector 18 formed of electrically insulative material is disposed on the support member with a circuit or electronics receiving chamber 18a formed between the connector and the support member and with an EMC shield 26 received in the cavity. An O-ring 28 is received in a seating groove formed in the connector with a metallic housing member 30 welded to the support flange and placing a selected sealing load on the O-ring.

Figure 2:
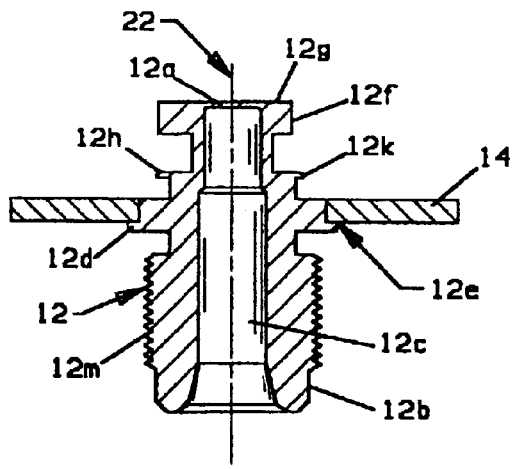
FIG. 2 is a cross-sectional view of the port fitting and support flange shown in FIG. 1.
Figure 2A:
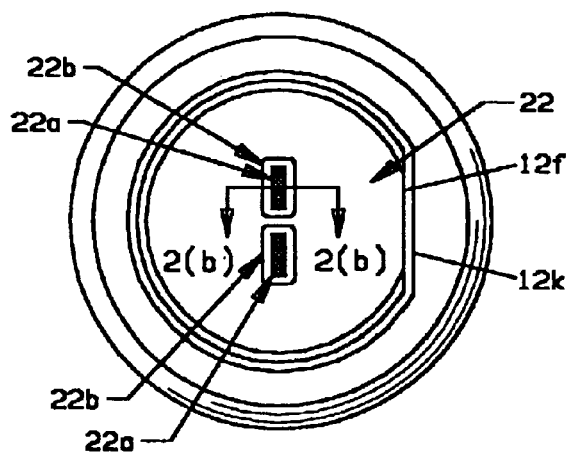
FIG. 2(a) is a top plan view of the pedestal end of the port fitting of FIG. 2.
Figure 2B:
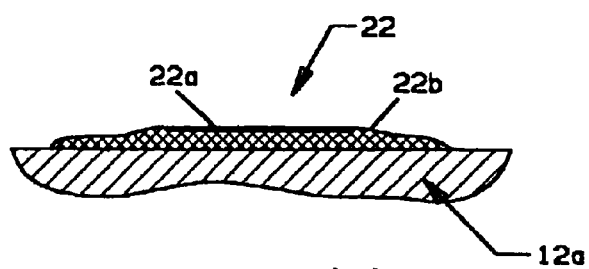
FIG. 2(b) is an enlarged cross-sectional view taken on line 2(b)—2(b) of FIG. 2(a)
Figure 3:
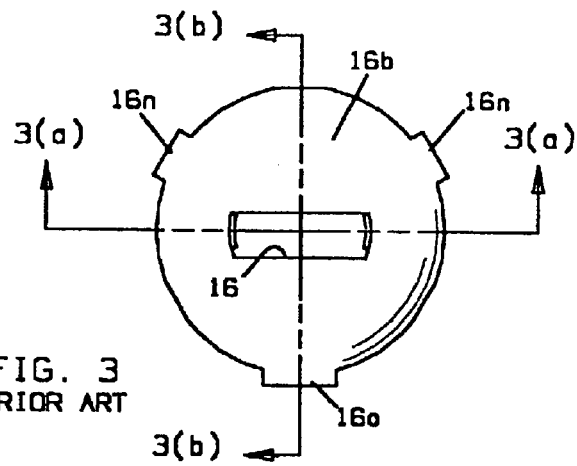
FIGS. 3 and 3(c) are top and bottom plan views, respectively, of the support member of the FIG. 1 transducer.
Figure 3A:
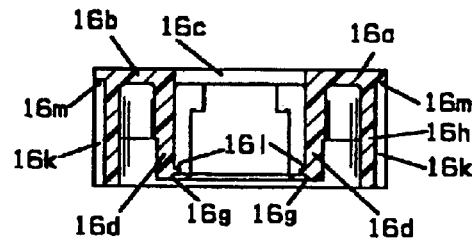
FIG. 3(a) is a cross-sectional view taken on line 3(a)—3(a) of FIG. 3.
Figure 3B:
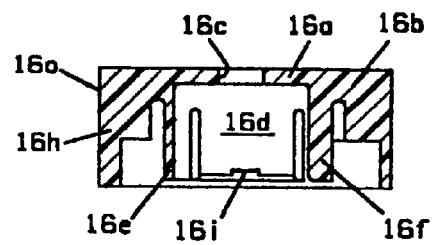
FIG. 3(b) is a cross-sectional view taken on line 3(b)—3(b) of FIG. 3.
Figure 3C:
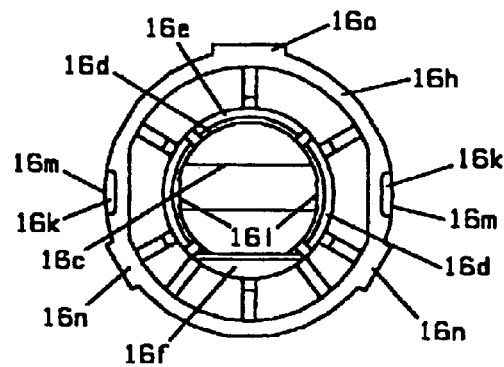

In more specific detail, as best seen in FIGS. 2, 2(a) and 2(b), port fitting 12 is formed with an open elongated coupling end 12b forming a fluid pressure receiving chamber 12c which extends up to an integrally formed diaphragm portion 12a in the pedestal end. Suitable mounting means, such as thread 12m, is provided on the elongated coupling end. A sensor assembly 22, mounted on the external, flat surface of diaphragm portion 12a, comprises strain gauge elements 22a attached to the diaphragm portion by glass material 22b with the glass material bonded to both the strain gauge elements and the diaphragm surface in accordance with conventional strain gauge techniques.

An outwardly radially extending support flange 14 is received on annular shelf 12d of the fitting and welded at 12e all around the periphery to form a hermetic seal.

The pedestal end of port fitting 12 is provided with an angular orientation feature for placement of support member 16 comprising a longitudinally extending flat surface 12k which converts an otherwise circular cylindrical configuration to a non-circular configuration for reception of a complimentary shaped seating surface in support member 16 to be discussed. A locking feature for support member 16 is also formed on the pedestal end in the form of an outwardly, radially extending generally annular lip 12h which preferably is also formed with a flat 12k formed at the same angular position of port fitting 12 as that of flat 12f.

Support member 16, best seen in FIGS. 3 and 3(a)–3(c), formed of suitable metal or plastic material, has an end wall 16a having a substantially flat, rigid support surface 16b. provided with a generally oblong aperture 16c through end wall 16a. A pedestal receiving seat is formed by discontinuous inner wall members 16d, 16e and 16f. Two opposed members 16d and member 16e form a portion of a circular cylinder while member 16f includes a flat surface complimentary to flat surface 12f of the pedestal. Opposed members 16d serve as legs formed with a radially inwardly extending catch 16i at their distal free ends which are receivable over lip 12h. An inclined camming surface 16g (FIG. 3(a)) is formed on the distal free end having a surface continuing on to the respective catch 16i to cam leg members 16d outwardly as the support member is placed onto the pedestal end and surface 16g is pressed against lip 12h. Support member 16 is also provided with a load bearing outer wall 16h which extends from the outer periphery of end wall 16a. Wall 16h is slightly longer than wall members 16d, 16e and 16f. Opposed longitudinally extending grooves 16k are formed in outer wall 16h leaving opposed ledges 16m which serve as a locking feature for connector 18, to be discussed. The outer periphery of support member 16 is also provided with an angular orientation feature for placement of the connector in the form of a plurality of longitudinally extending ribs, two ribs 16n having a first width and a third 16o having a second, different width.

Support member 16 is placed on the pedestal end of port fitting 12 with load bearing wall 16h received on flange 14 and the pedestal end received in the seat formed by wall members 16d, 16e and 16f and locked thereto in a selected angular orientation with aperture 16c in alignment with a central portion of the diaphragm portion 12a.

Figure 4:
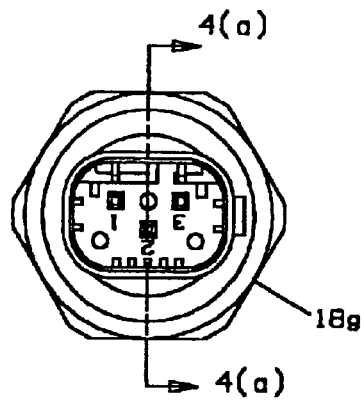
FIGS. 4 and 4(b) are top and bottom plan views, respectively, of the connector of the FIG. 1 transducer.
Figure 4A:
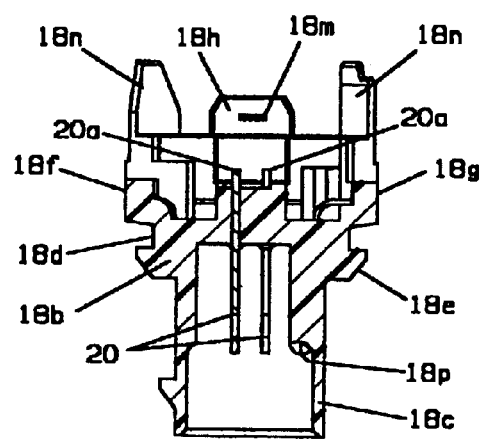
FIG. 4(a) is a cross-sectional view taken on line 4(a)—4(a) of FIG. 4.
Figure 4B:
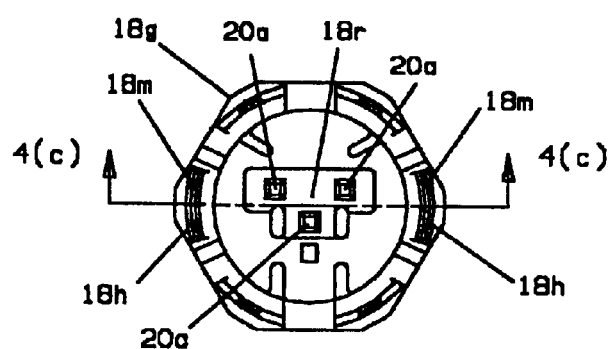
Figure 4C:
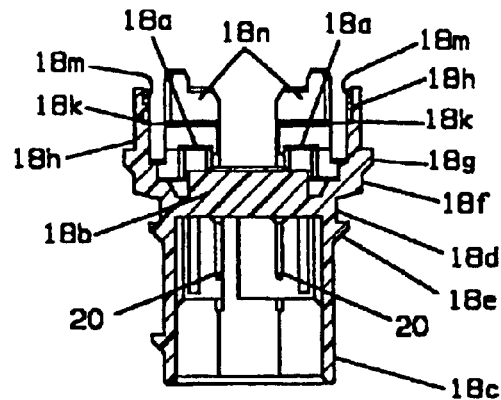
FIG. 4(c) is a cross-sectional view taken on line 4(c)—4(c) of FIG. 4(b)

Connector 18, with particular reference to FIGS. 4 and 4(a)–4(c), formed of suitable electrically insulative material, comprises a body portion 18b which mounts a plurality of elongated electrically conductive terminals 20 in spaced apart relation to one another. The terminals are identified on body portion 18b, as seen in FIG. 4, as 1, 2 and 3. The terminals extend through body portion 18b providing a distal end portion 20a for connection to a flexible circuit assembly 24, to be discussed. A sidewall 18c extends in one longitudinal direction from body portion 18b forming a shroud enclosing the exposed terminal members. Also formed in the outer periphery of the connector in the vicinity of the body portion is an O-ring seating groove 18d formed with the outboard or shroud side 18e of the connector defining the groove having a smaller diameter than the opposite side 18f in order to expose a selected surface area of an O-ring disposed in the groove, as will be discussed in further detail below.

The connector is preferably formed with at least a portion having a selected non-circular outer peripheral configuration 18g, such as hexagonal, on the opposite side of body portion 18b from the shroud to facilitate mounting of the transducer, and with a plurality of leg portions extending therefrom. Opposed leg portions 18h are formed with an EMC shield seating shelf 18k and an inwardly, radially extending catch 18m. Legs 18n are spaced from one another sufficiently to form a passage for receipt of flexible circuit assembly 24 and to receive therebetween ribs 16n, 16o of support member 16 when the connector is assembled thereto as well as to allow spring tabs 26d of an EMC shield 26 to extend out beyond the connector, to be discussed below. When assembled, the outer peripheral portions of end wall 16a and lip 26c of the EMC shield are received on ledge 18k and catches 18m are received over ledge 16m to lock the connector in a selected angular orientation to the support member and port fitting.

Figure 5:
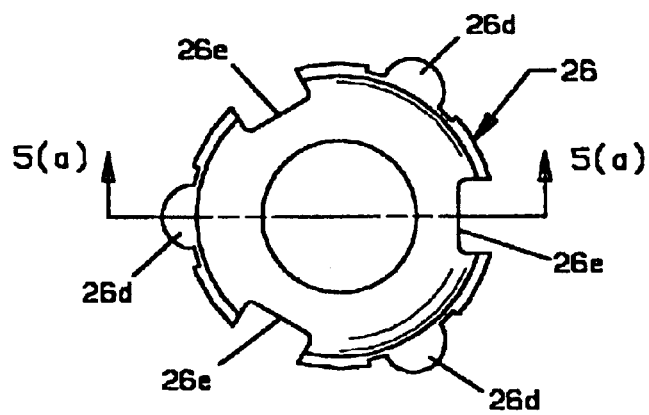
FIG. 5 is a bottom plan view of the EMC shield of the FIG. 1 transducer.
Figure 5A:
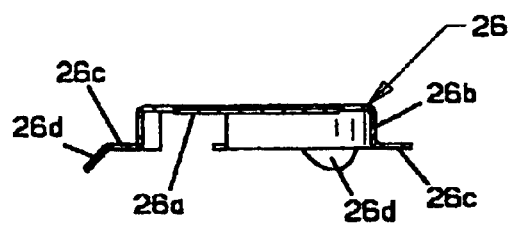
FIG. 5(a) is a cross-sectional view taken on line 5(a)—5(a) of FIG. 5.

EMC shield 26, FIGS. 5 and 5(a), formed of suitable metallic material, is generally cup-shaped having an end wall 26a and sidewall 26b depending therefrom formed with an outwardly radially extending flange 26c from which extend a plurality of spring tabs 26d. Cut-out portions 26e are provided to allow passage of flexible circuit assembly 24 into electronic circuit cavity 18a. Although only one cut-out portion 26e is required, providing three such portions spaced 120 degrees apart facilitates proper orientation of the shield in the connector. Shield 26 is placed in the transducer after the flexible circuit assembly is installed as will be described below.

Figure 5B:
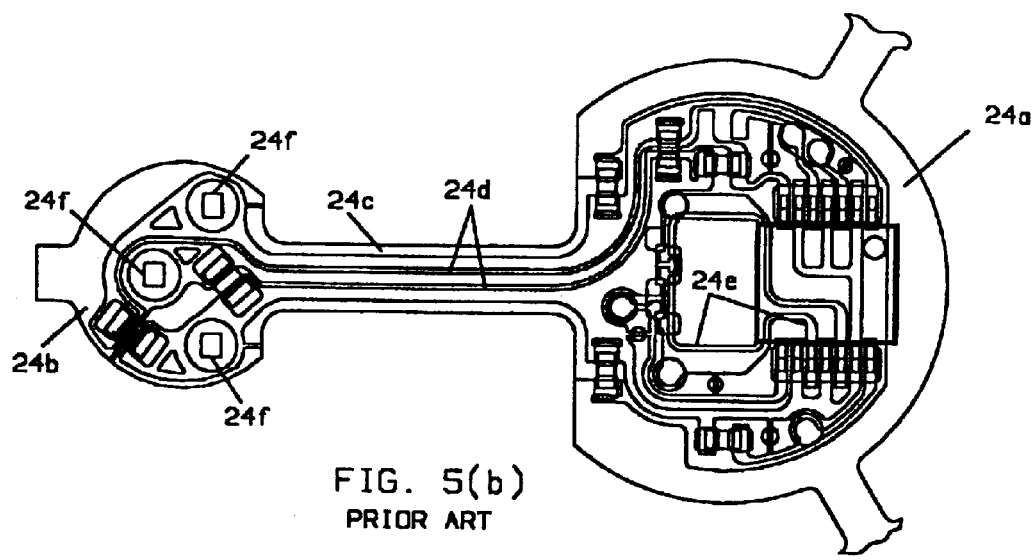
FIG. 5(b) is a top plan view of a flexible circuit of the FIG. 1 transducer prior to being bent into the U-shaped configuration of FIG. 1.

With particular reference to FIG. 5(b), flexible circuit assembly 24 comprises a flexible substrate comprising first and second lobe portions 24a, 24b interconnected by an intermediate strip portion 24c, the substrate being formed of suitable electrically insulative material. Lobe portions 24a, 24b preferably include stiffener material to which the substrate material is bonded while lobe portion 24a includes a layer of adhesive. Appropriate circuit traces 24d of copper, preferably plated with nickel and gold, are applied to the substrate. Lobe portion 24a is bonded to the flat, rigid surface 16b of support member 16 with generally oblong opening 24e aligned with aperture 16c of the support member.

As described in copending application Ser. No. 09/723,139, the subject matter of which is incorporated herein by this reference, terminals 20 are received through openings 24f of lobe portion 24b and soldered to conductive pads on the lobe portion with the connector in a convenient inverted orientation. Sensor elements 22a are connected to circuit pads on lobe portion 24a by suitable conductive wires (not shown) with this portion encapsulated by suitable electrically insulative material 22d (FIG. 1). The EMC shield is placed in connector 18 with annular lip 26c received on shelf 18k and with tabs 26d extending between wall portions 18h, 18n out beyond the outer periphery of the wall portions. Connector 18 is then inverted to the position shown in FIG. 1 and catches 18m of wall portion 18h are snapped onto ledges 16m. O-ring 28 is then inserted in O-ring seat 18d and metallic housing 30 is placed over connector 18 as seen in FIG. 1 with flange 30a of the housing welded to flange 14 forming an hermetic seal. The downward movement of the housing relative to connector 18 causes inclined, frustoconical surface 30c to place a compressive force on O-ring 28 forming a fluid tight seal and maintaining an axial load on the entire stack of components. The load on housing member 30 through the O-ring helps to maintain intimate electrical connection of the ground trace on flexible circuit assembly 24 and flange 26c of EMC shield 26 by means of forces transferred through shelf 18k. Tabs 26d of the EMC shield extending outwardly beyond the sidewall members of connector 18 are spring biased into electrical engagement with the inside wall of housing member 30.

Figure 6:
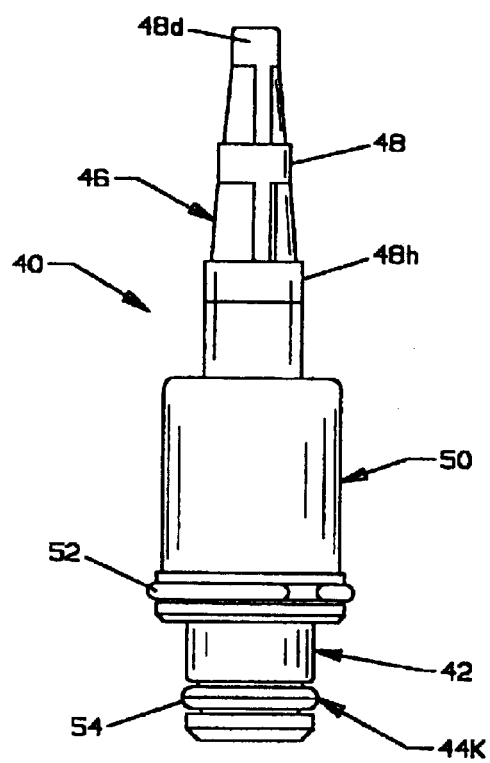
FIGS. 6 and 6(a) are front elevational and top plan views, respectively, of a transducer made in accordance with a second embodiment of Ser. No. 09/723,139.
Figure 6A:
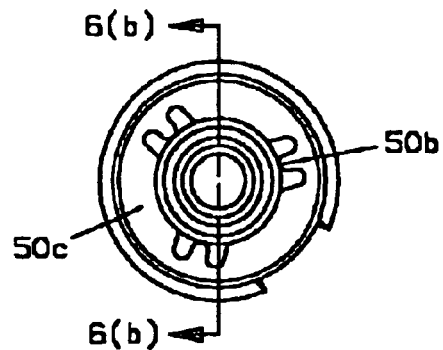
Figure 6B:
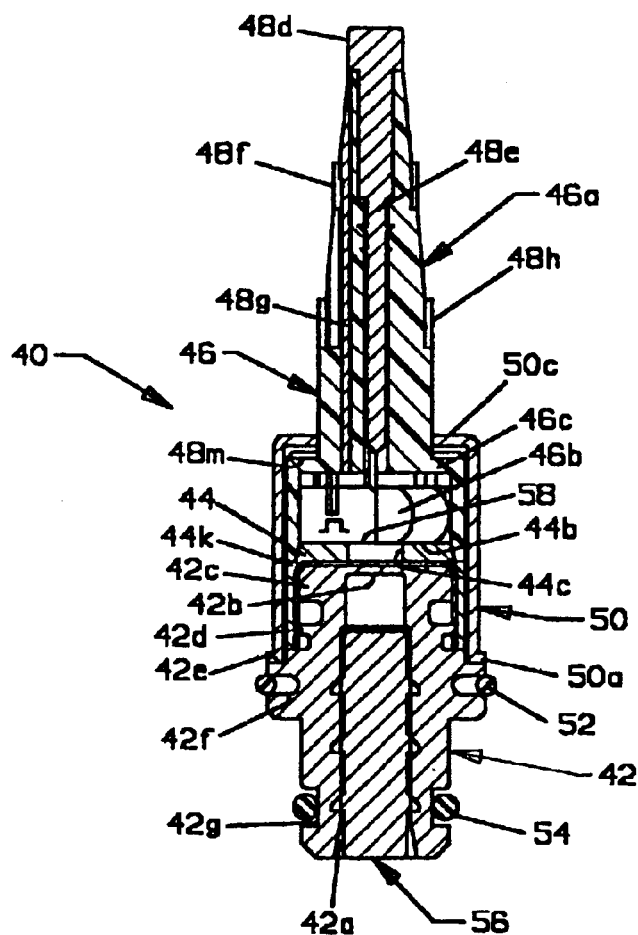
FIG. 6(b) is a cross-sectional view taken on line 6(b)—6(b) of FIG. 6(a)

The embodiment of a second embodiment, shown in FIGS. 6, 6(a), 6(b), comprises structure which is particularly conducive to making a miniaturized transducer useful for certain applications in which available space is especially limited, for example, when used for vehicular brake pressure transducer applications. Transducer 40 made in accordance with this embodiment comprises a tubular port fitting 42 having a bore 42a extending from one end to a diaphragm portion 42b in a pedestal end 42c. Strain gauge sensor elements are mounted on diaphragm portion 42b as in the FIGS. 1–5 embodiment. A support member 44, similar to support member 16, is received on pedestal end 42c and a connector 46 of electrically insulating material is received on support member 44. A metallic tubular housing member 50 is disposed over the body portion of the connector and extends to a mounting annular shelf 42e on port fitting 42. A spring ring 52 and a gasket 54 are received in respective annular grooves 42f, 42g in the outer periphery of port fitting 42. A suitable plug 56 is received in bore 42a of port fitting 42. Plug 56 consumes most of the volume of the blind hole and is provided with passages to allow fluid being monitored to pressurize the diaphragm portion of the sensor. A circuit chamber 46b formed in connector 46 receives a flexible circuit assembly 58 similar to flexible circuit assembly 24 of the FIG. 1 embodiment and a plurality of terminals extend through the connector in spaced apart relation and have respective circular contact portions 48h, 48f and 48d, each having a progressively smaller diameter disposed at longitudinally spaced locations on an exposed surface of a generally tapered, elongated connector portion 46a.

Terminal 48e comprises cylindrical contact portion 48d disposed at the small outer diameter end of mounting portion 46a with an elongated portion extending therefrom through mounting portion 46a into a circuit chamber 46b. The next adjacent cylindrical contact portion 48f has a slightly larger outer diameter and is spaced longitudinally from contact portion 48d. Contact portion 48f has an elongated portion 48g which extends therefrom through mounting portion 46a into circuit chamber 46b. The next adjacent cylindrical contact portion 48h has a still larger outer diameter and is spaced longitudinally from contact portion 48f and has an elongated portion (not shown) which extends therefrom through mounting portion 46a into circuit chamber 46b. A ground ring 48m is disposed on radially outwardly extending annular shelf 46c.

Housing 50, an open tubular cylindrical member formed of electrically conductive material has a mounting flange 50a at one opposite end and a plurality of inwardly and downwardly projecting tabs 50b at its opposite end 50c. The housing member is received over a portion of connector 46 and support member 44 with one end 50a received on shoulder 42e of tubular fitting 42 and with tabs 50b biased against conductive contact ring 48m. The housing is suitably attached to fitting 42 as by welding.

Transducer 40 is assembled, as is transducer 10 of the first embodiment, by snapping support member 44 onto the pedestal end of port fitting 42. One lobe portion of flexible circuit assembly 58 is securely bonded to rigid flat surface 44b of the support member and the partial assembly is placed adjacent to an inverted connector 46 in the same manner as in the first embodiment with the seating surfaces for the lobe portions lying in essentially the same plane. Flexible circuit assembly 58 is formed similarly to flexible circuit assembly 24 with an oblong opening aligned with aperture 44c of the support member and the strain gauge sensor elements (not shown) bonded to diaphragm portion 42b in the same manner as in the first embodiment described above.

Connector 46 is then inverted with intermediate portion of the flexible circuit assembly folded into a U-shaped configuration and with the connector received on the support member. Housing member 50 is then placed over the connector and support member and welded to port fitting 42 and plug 56 is inserted to complete the assembly.

Figure 7:
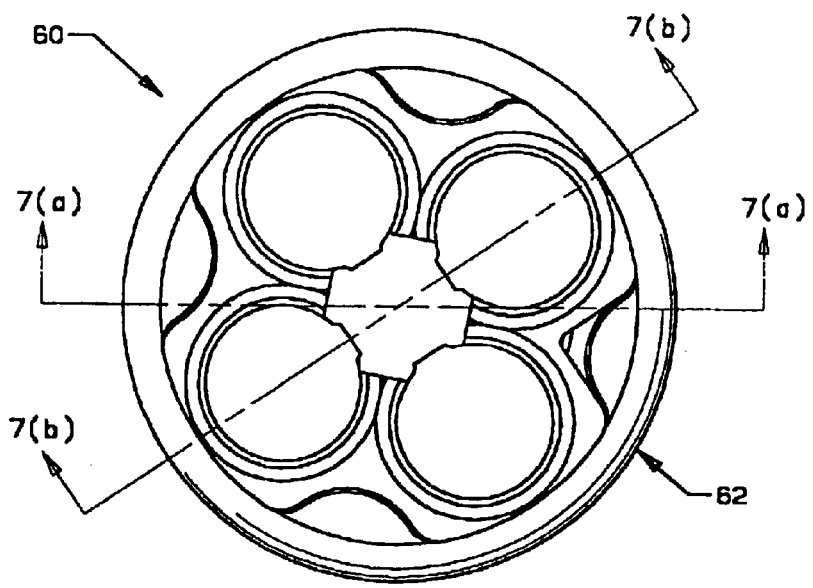
FIG. 7 is a top plan view of a pressure transducer made in accordance with a first preferred embodiment of the present invention.
Figure 7A:
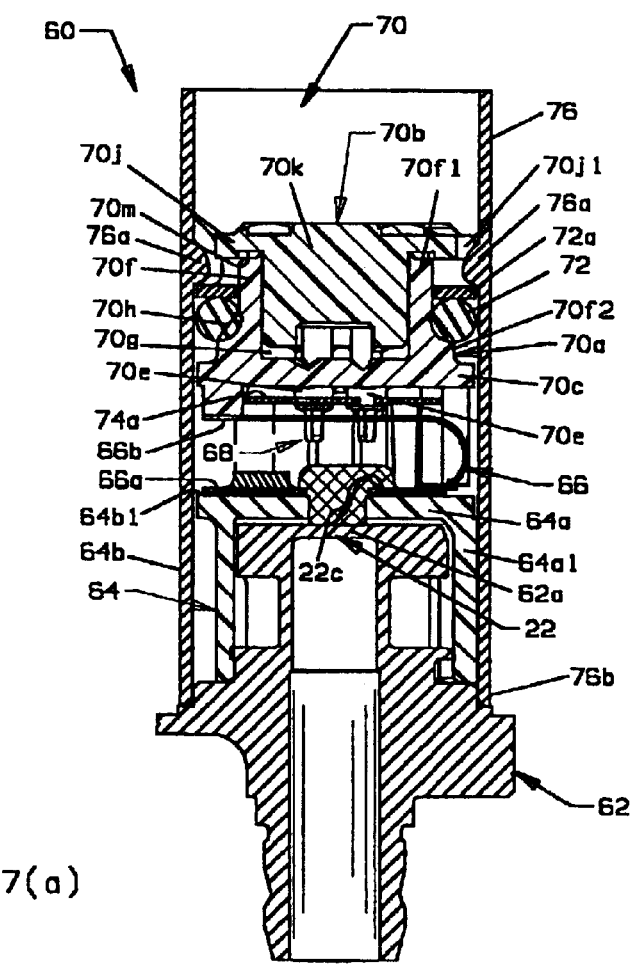
FIG. 7(a) is a cross-sectional view taken on line 7(a)—7(a) of FIG. 7.
Figure 7B:
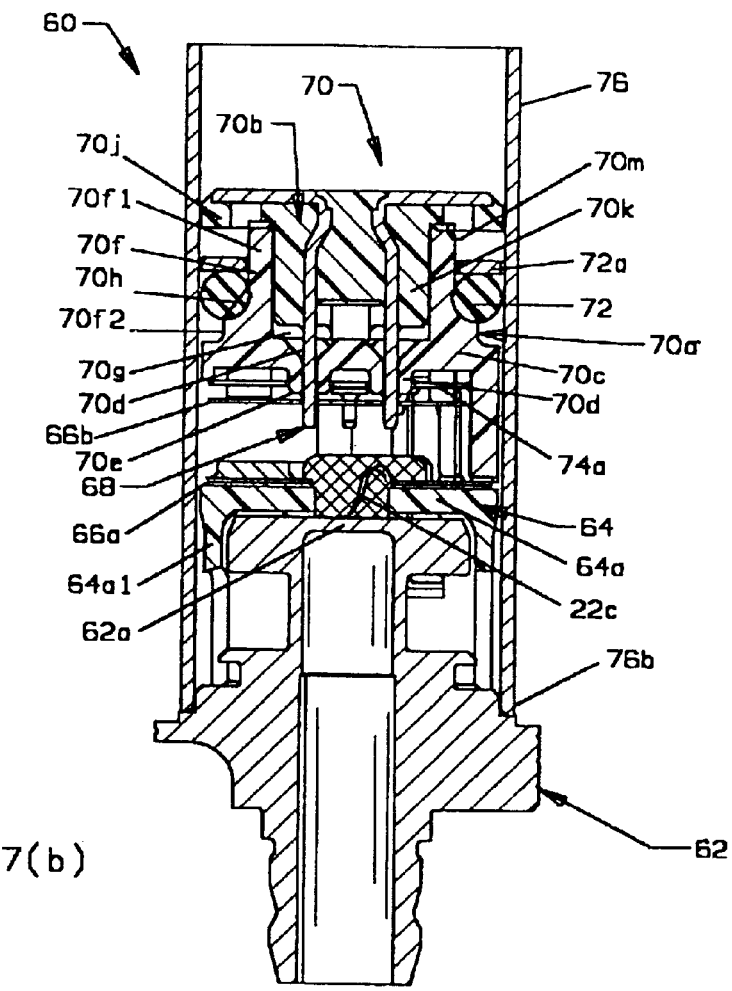
FIG. 7(b) is a cross-sectional view taken on line 7(b)—7(b) of FIG. 7.

The transducer of FIGS. 7–12 provides a first preferred embodiment made in accordance with the invention particularly adapted for miniature transducers of the type shown in FIG. 6 but having structure to enhance assembly, to provide an EMC shield for maximum shielding as well as an attachment mechanism between the support member and the connector particularly useful during the assembly process and to provide an enhanced sealing mechanism. With particular reference to FIGS. 7, 7(a) and 7(b), miniature transducer 60 comprises a tubular port fitting 62 similar to port fittings 12 and 42 having a pedestal end with a diaphragm portion 62a on which a sensor assembly 22 is mounted in the same manner as sensor assembly 22 of the FIG. 1 structure. Support member 64 is received over the closed pedestal end of port fitting 62 and has an end wall 64a with a flat top surface to which lobe portion 66a of flexible circuit assembly 66 is bonded and with sensor assembly 22 electrically connected to electrically conductive traces on lobe portion 66a by suitable wires 22c. The flexible circuit assembly is bent into a U-shaped configuration as shown in FIG. 7(a) with lobe portion 66b interconnected with terminals 68 mounted in connector 70. Connector 70 has first and second interfitting portions 70a, 70b. As best seen in FIGS. 7(a), 7(b) and 8(b), generally cylindrical portion 70a serves as a base and has an end wall 70c provided with terminal receiving apertures 70d extending through end wall 70c and bosses 70e depending downwardly from the end wall. Sidewalls 70f define a downwardly extending, centrally disposed cavity 70g. The outer portion of sidewall 70f is formed with a tapered O-ring seating surface 70h extending from an upper reduced diameter straight cylindrical portion 70f1 to a lower larger straight cylindrical portion 70f2 which is preferably formed with a diameter reduced relative to that of end wall 70c to provide space for an O-ring, to be described, to expand into. O-ring 72 is received around cylindrical portion 70f1 on seating surface 70h. For purposes of illustration, the O-ring is shown in the drawings in the axial position after loading although the deformed configuration is not shown. A loading washer 72a is received around cylindrical portion 70f1 on top of O-ring 72.

Figure 10:
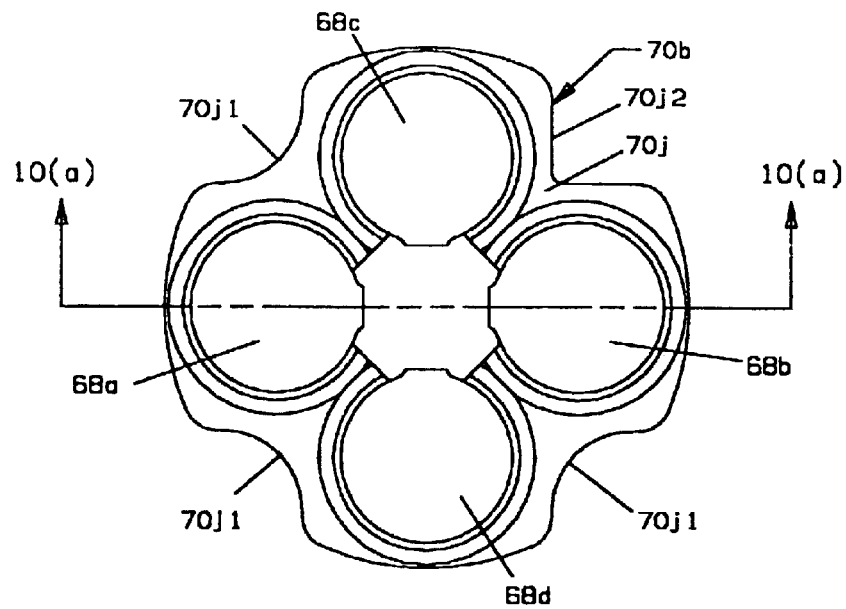
FIG. 10 is a top plan view of the second connector portion of FIG. 8.
Figure 10A:
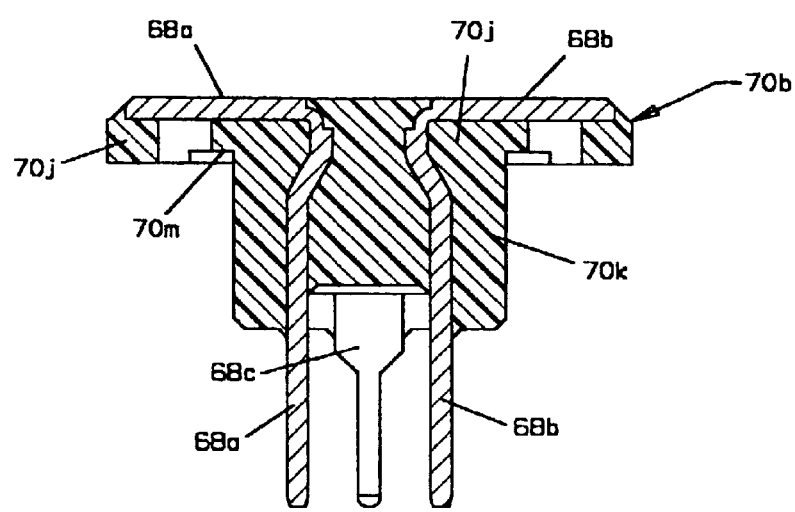
FIG. 10(a) is a cross-sectional view taken on line 10(a)—10(a) of FIG. 10.

Connector portion 70b, see FIGS. 8(b), 10, 10(a), has an upper end wall 70j from which a centrally disposed hub 70k extends downwardly and is received in cavity 70g. A plurality of spaced apart cut-out portions 70j1, 70j2 are formed in the outer periphery of end wall 70j for a purpose to be described below. End wall 70j is formed with an annular groove 70m on its lower surface around hub 70k which is aligned with the upper wall portion 70f1 when hub 70k is placed in the cavity. The distal free end of wall portion 70f1 preferably is formed with a ridge 70n to facilitate ultrasonic welding of the two connector portions together after O-ring 72 and washer 72a have been mounted with the plastic flash being confined to groove 70m. This locks the O-ring and washer in place during assembly and also seals cavity 70g. Terminal assembly 68 comprises individual terminals 68a–68d insert molded in connector portion 70b as best seen in FIGS. 10 and 10(a). Individual terminals 68a–68d comprise an upper contact plate portion received on end wall 70j and an elongated terminal leg extending through hub 70k. Connector portion 70b is placed on connector portion 70a with hub 70k received in cavity 70g and with the terminal legs extending through bores in end wall 70c and bosses 70e.

Figure 8:
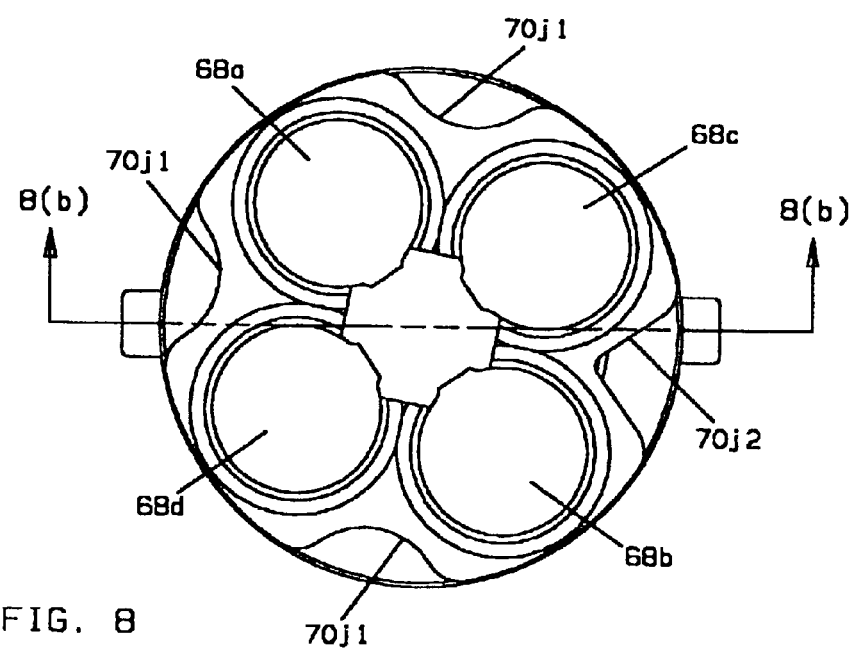
FIG. 8 is a top plan view of the connector and EMC shield sub-assembly of FIG. 7.
Figure 8A:
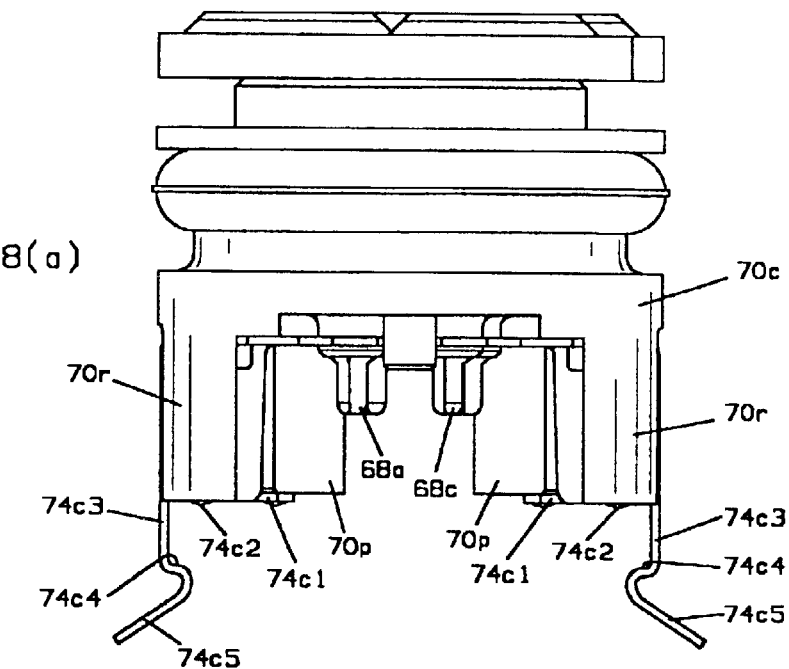
FIG. 8(a) is an elevational view of the FIG. 8 sub-assembly taken prior to ultrasonically welding two portions of the connector together.
Figure 8B:
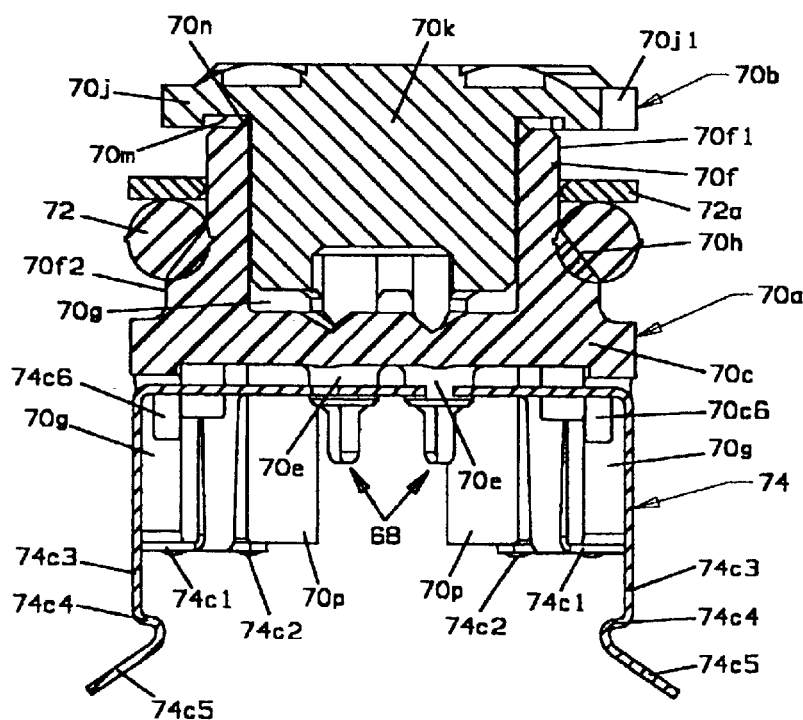
FIG. 8(b) is a cross-sectional view of the FIG. 8 sub-assembly taken on line 8(b)—8(b) of FIG. 8 taken prior to ultrasonically welding two portions of the connector together.
Figure 9:
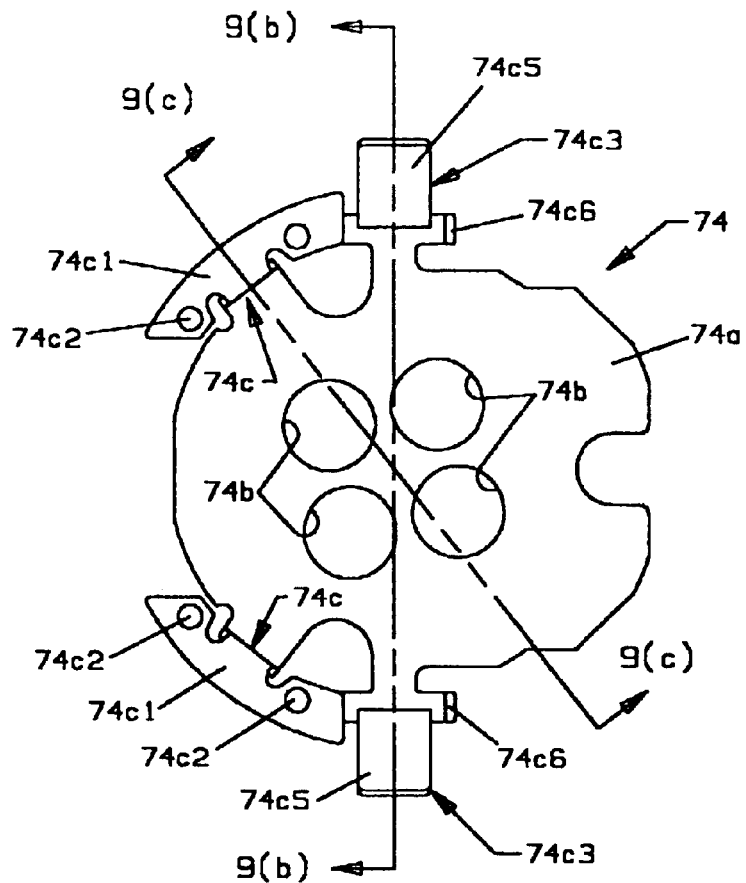
FIG. 9 is a top plan view of the EMC shield of the FIG. 8 assembly inverted relative to FIG. 8(b)
Figure 9A:
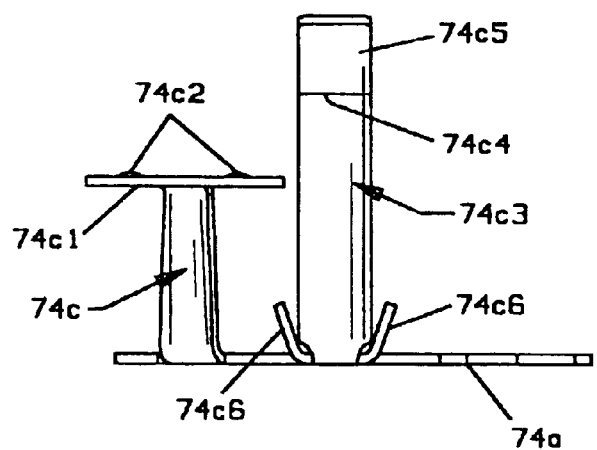
FIG. 9(a) is a front elevational view of the FIG. 9 shield.
Figure 9B:
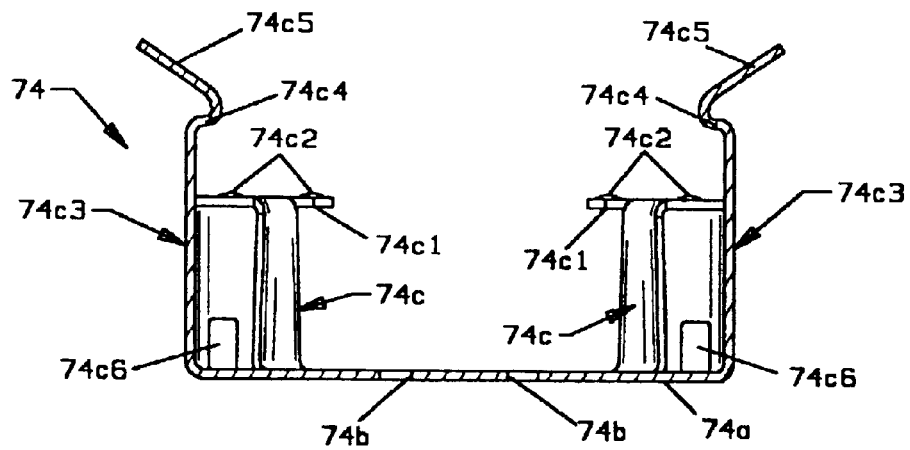
FIG. 9(b) is a cross-sectional view taken on line 9(b)—9(b) of FIG. 9.
Figure 9C:
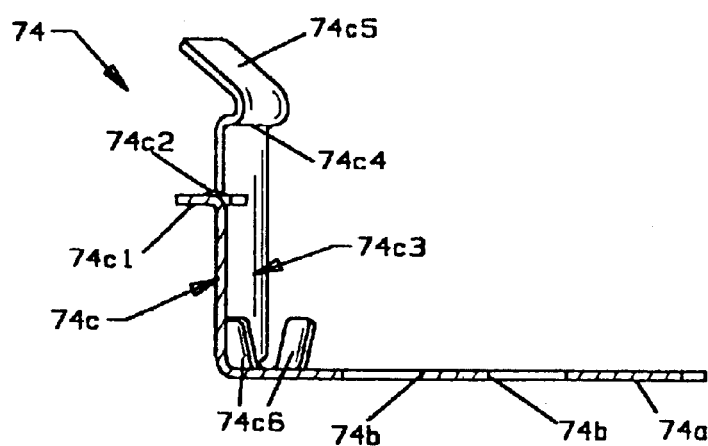
FIG. 9(c) is a cross-sectional view taken on line 9(c)—9(c) of FIG. 9.

An EMC shield 74, see FIG. 8(a), 8(b) and shown separately in FIGS. 9, 9(a)–9(c), is composed of suitable electrically conductive material having good spring characteristics. The EMC shield has an end wall 74a formed with a plurality of enlarged terminal receiving apertures 74b and with first legs 74c extending upwardly, as seen in FIGS. 9, 9(a)–9(c), from the outer periphery of end wall 74a. Legs 74c are each formed with a shelf or foot 74c1 at their distal free end, the shelves lying in a plane generally parallel to a plane in which the end wall 74a lies. Preferably, protrusions 74c2 are formed in shelves 74c1 for a purpose to be discussed below. A pair of diametrically opposed second attachment legs 74c3 also extend upwardly (as shown in FIGS. 9, 9(a)–9(c)) from the outer periphery of end wall 74a, each having at their distal free ends, an inwardly extending catch surface 74c4 and an outwardly inclined camming surface 74c5. A pair of attachment tabs 74c6 extend upwardly from end wall 74a adjacent each leg 74c3, one tab on each opposite side of a respective leg. The tabs are inclined outwardly and are spaced slightly inboard of legs 74c3, i.e., closer to the center of end wall 74a, for a purpose to be described below.

EMC shield 74 is attached to connector 70 with bosses 70e of first connector portion 70a received through apertures 74b in end wall 74a. Legs 74c3 are received in slots 70q between legs 70p, 70r of the connector with attachment tabs 74c6 wedged into engagement with the sidewalls of the slots to provide a connection of the EMC shield and the connector during assembly. Legs 74c are located in board of legs 70p depending from first connector portion 70a with shelves 74c1 extending over the distal free end of legs 70p.

O-ring 72 and loading washer 72a are placed on connector portion 70a and connector portion 70b is attached thereto as by ultrasonically welding (see FIG. 8(b)). The flexible circuit assembly is mounted on connector 70 in the same manner as described in copending application Ser. No. 09/723,139 referenced above but with end wall 74a of the EMC shield disposed between the connector and the flexible circuit. The connector, shield sub-assembly is attached to the support member 64 (FIG. 12) by attachment legs 74c3 which are forced outwardly by angled portion 74c5 engaging the outer periphery of support member 64 and are received in respective windows 64a1 of wall 64a of the support member and with catches 74c4 engaging with ledges 64a2 of the support member. The free distal end of angled portion 74c5 extends outwardly beyond the outer periphery of the sidewall of the support member for electrical engagement with housing 76 to be described. With reference to FIG. 8(a), 8(b) and as noted above, attachment legs 74c3 are received in respective slots 70q between legs 70r, 70p extending downwardly from end wall 70c as seen in FIGS. 8(a), 8(b). The distance from the upper edge of ledge 64a2 (FIG. 12) to the upper surface 64b1 of each end wall 64b relative to the distance from catch 74c4 to the outer surface of shelves 74c1 is selected so that protrusions 74c2 of the shelves are biased into engagement with contact pads on flexible circuit assembly 66. The length of legs 70r is essentially the same as the length of legs 70p plus the thickness of shelves 74c1 so that EMC shield 74 serves as a means for attaching connector 70 to support member 64 through EMC shield legs 74c3. Optimum electrical connection through protrusions 74c2 of shelves 74c1 is effected on final assembly of the transducer by means of the compressive force on the stack of components provided by housing member 76 through O-ring 72. Legs 74c with shelves 74c1 backed up by walls 70p serve to stabilize the connection of the connector and EMC shield with support member 64.

The attachment mechanism provided by attachment tabs 74c6 which enables the connection between support member 64 and connector 70 during assembly facilitates the final assembly of the housing and prevents separation of the components caused, for example, by the straightening force of the stiffened U-shaped flexible circuit.

Figure 11:
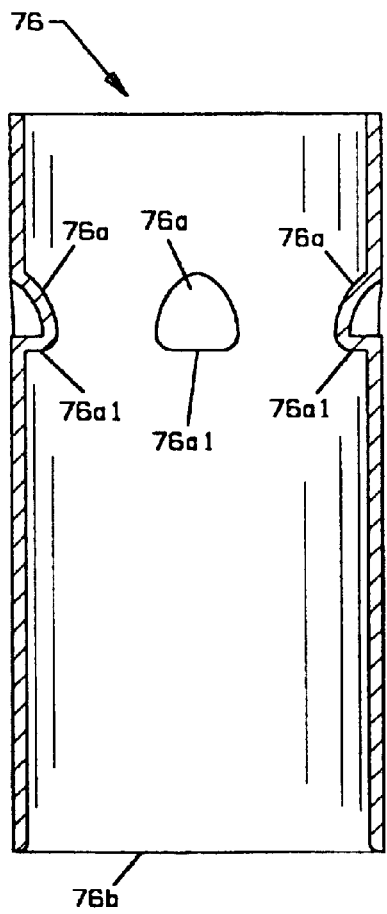
FIG. 11 is a longitudinal cross-sectional view of the outer housing of the FIG. 7 transducer.
Figure 12:
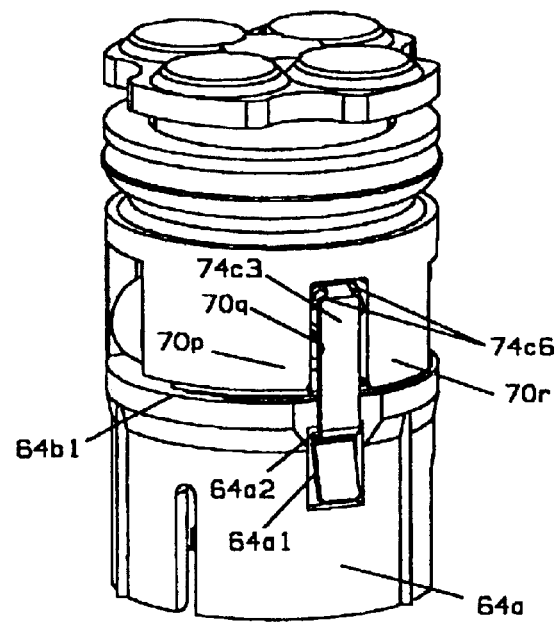
FIG. 12 is a perspective view showing details of the attachment of the connector, EMC shield sub-assembly of FIG. 8 to the support member of the transducer.

As seen in FIG. 11, outer housing 76 is configured as a cylindrical tube of suitable electrically conductive material and is formed with a plurality of protrusions 76a having an inwardly extending wall portion 76a1. The protrusions are spaced from one another and are formed so that they are alignable with cut-out portions 70j1, 70j2 of connector 70 and fit within such cut-out portions and are located from lower end face 76b of the housing a distance selected to apply a compressing force on O-ring 72 through loading washer 72a which in turn places a load in the direction of the longitudinal axis on the stack of components including connector 70, flexible circuit assembly 66, support member 64 and port fitting 62. The inside diameter of housing 76 is chosen so that the housing fits freely over the O-ring so that the O-ring does not make significant contact with the housing until the bottom wall 76a1 of protrusions 76a, aligned with cut-outs 70j1, come into engagement with washer 72a and the O-ring is forced to expand on the inclined connector surface 70h. This feature facilitates obtaining an easy assembly that does not result in large assembly forces that could endanger other fragile aspects of the transducer. The angle of inclined surface 70h is such that during assembly the O-ring exerts a downward force on the sensor components while expanding outwardly to make an environmental seal with the inside wall of housing 76. The space formed by wall portion 70j2 and housing 76 enables the O-ring to expand into it when exposed to high temperatures or in the event that component tolerances are at their extremes. Without this space, the stresses in the O-ring could be large enough to induce significant compression set leading to a loose sensor stack. Housing 76 makes electrical engagement with the free ends of angled portions 74c5 and is forced into engagement with port fitting 62 and is welded thereto at end 76b around the periphery of the housing. O-ring 72 maintains the compressive force on the sensor stack ensuring that the electrical connection between EMC shield 74 and the flexible circuit ground ring is reliable. Loading washer 72a ensures that the compressive force exerted by the housing is evenly distributed across the O-ring so that compression set and creep do not result in a failed connection. As noted above, connector portions 70a, 70b are formed so that they can be ultrasonically welded together trapping O-ring 72 and washer 72a in the assembly. This ensures that the components do not fall apart during assembly while also sealing a potential leak path.

The provision of loading washer 72 avoids the development of highly concentrated loads which could lead to relaxation of the elastomer and eventual loosening of the sensor stack. A loose sensor stack can result in a failed connection between the EMC shield and the flexible circuit ground ring. Additional damage induced by vibration is also likely with a loose stack. Thus the sealing system utilized in the FIGS. 7(a), 7(b) transducer provides compression on the components while avoiding localized over-compression to maintain a reliable connection while making an environmental seal between the housing 76 and the connector 70. This takes place within a limited space and the design of the components allows for manufacturing without difficult assembly sequences that could result in other damage.

FIGS. 13, 13(a), 13(b), 13(c) show another preferred embodiment made in accordance with the invention of the type shown in FIG. 6. Transducer 80 comprises a port fitting 82, sensor assembly 22 mounted on diaphragm 82a, support member 84, flexible circuit assembly 66 and connector 86 in which terminals 88 are insert molded similar to like components of transducer 60 of FIGS. 7(a), 7(b). The wires connecting sensor assembly 22 and the flexible circuit assembly and the encapsulant are not shown in the drawings for purposes of illustration but are the same as in the previously described embodiments.

An EMC ring 90 is insert molded in connector 86 with an exposed annular shelf 90d supported by an outwardly, radially extending flange 86a of the connector. Elongated legs 90a extend downwardly from ring 90 and are provided with an outwardly flared free distal end portion 90b for electrical engagement with housing 92. EMC ring 90 preferably has a terminal portion 90c (see FIG. 13(e)) which extends downwardly through a connector body 86b for electrical connection to the flexible circuit assembly 66, as by soldering. As seen in FIG. 13(d), connector 86 is provided with downwardly extending legs 86c having a radially inwardly facing, laterally extending groove 86d for receiving an exposed portion of end wall 84b of support member 84 and lobe portion 66a of the flexible circuit assembly. The distal free end of legs 86c are receivable in windows 84c formed in sidewall 84a of support member 84 and end wall 84b best seen in FIG. 13(f). The distal end portion of legs 86c have a beveled surface 86e for engaging the inner edge portion of the windows to bias the distal free end portions outwardly allowing end wall portion 84b and the flexible circuit portion to be received in the groove. In this embodiment, groove 86d engages with end wall 84b without having to change the outer circumference of the connector relative to the support member. Housing 92, formed of electrically conductive material, is configured as a tubular cylinder formed with an inwardly, radially extending flange 92a at its upper end forming an opening to closely receive the upper portion of body 86b of connector 86 and with flange 92a aligned with the exposed annular shelf 90d. O-ring 94 is disposed on the exposed shelf of EMC ring 90 and is compressed when housing 92 is brought down with end 92b butting up against a seating ledge on tubular fitting 82 and is welded thereto with the compressed O-ring forming an environmental seal and transferring the compressive force to the stack of sensor components.

Figure 13:
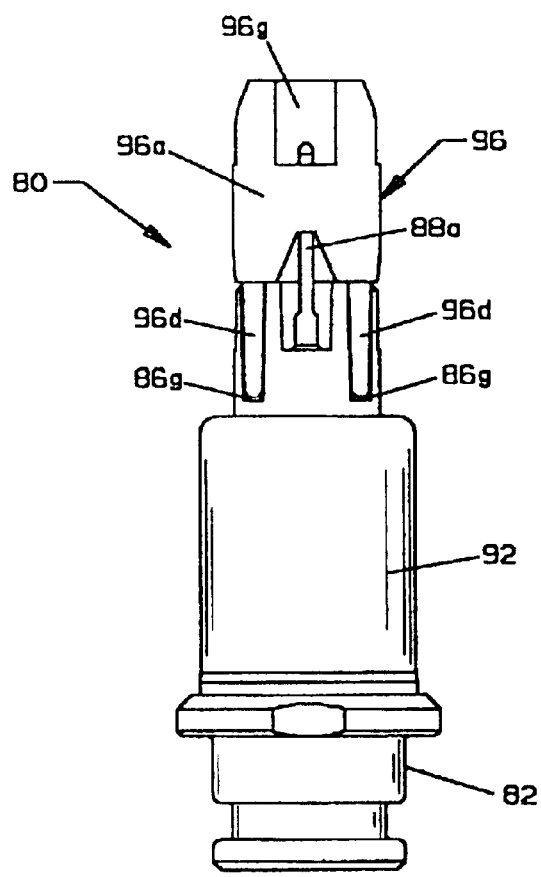
FIG. 13 is an elevational view of a pressure transducer made in accordance with a second preferred embodiment of the invention.
Figure 13A:
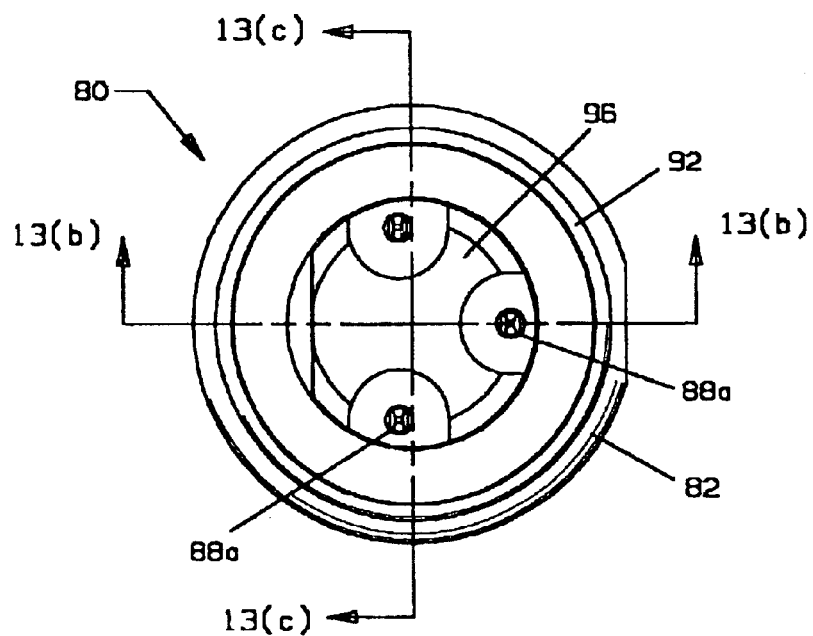
FIG. 13(a) is a top plan view of the FIG. 13 transducer.
Figure 13B:
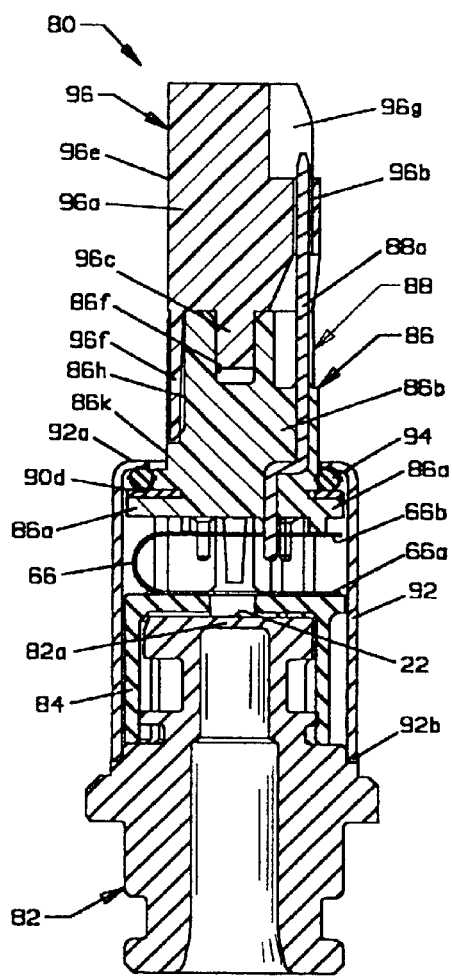
FIG. 13(b) is a cross-sectional view taken on line 13(b)—13(b) of FIG. 13(a)
Figure 13C:
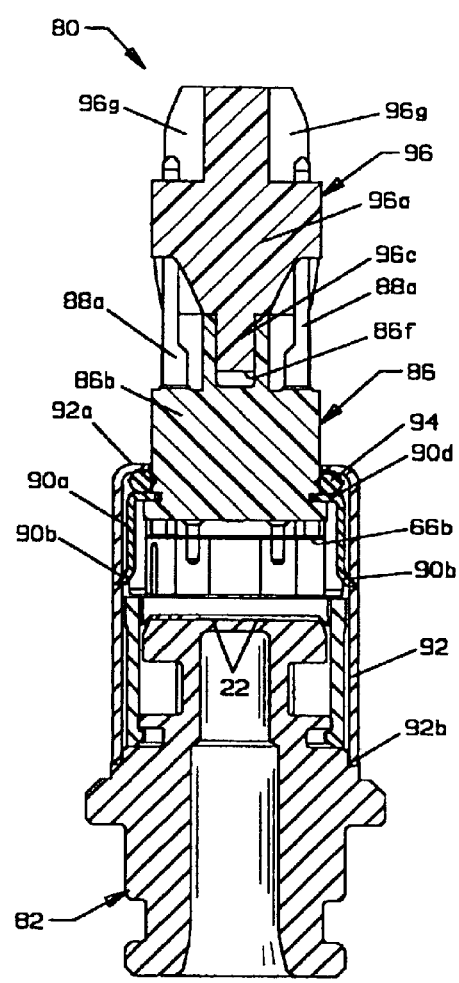
FIG. 13(c) is a cross-sectional view taken on line 13(c)—13(c) of FIG. 13(a)
Figure 13D:
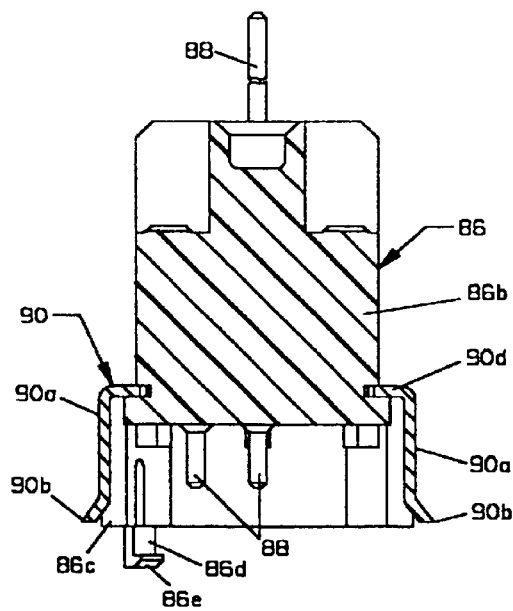
FIG. 13(d) is a longitudinal cross-sectional view taken through the connector, EMC shield sub-assembly of FIG. 13.
Figure 13F:
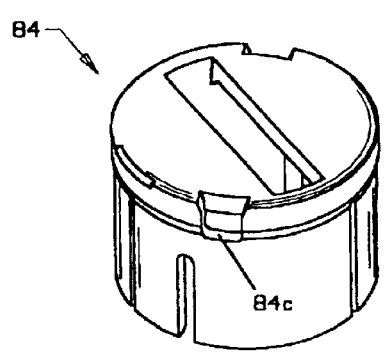
FIG. 13(f) is a perspective view of the support member of FIG. 13(e) showing a connector leg receiving window.
Figure 13E:
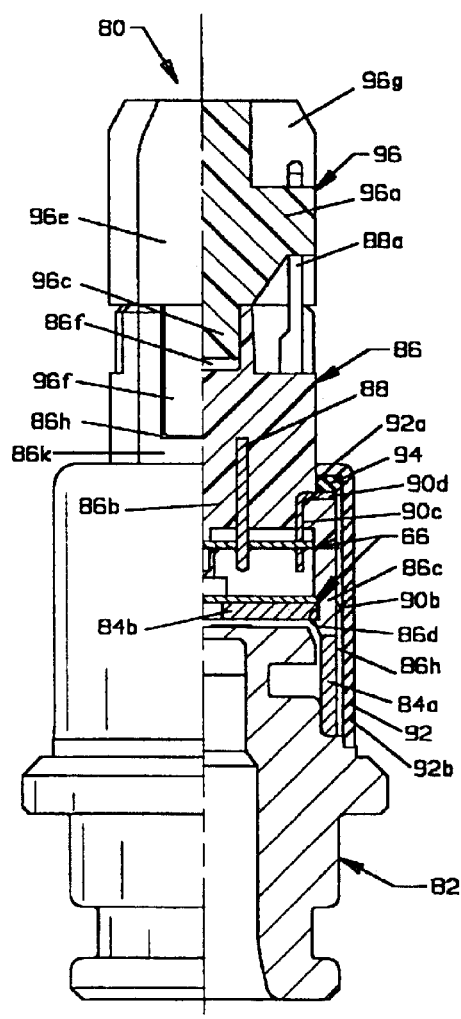
FIG. 13(e) is an elevational view, partly in cross section, of the pressure transducer of FIG. 13 showing details of the interconnection of the connector and the support member.

Transducer 80, shown in FIG. 13, is provided with an elongated portion 88a of the terminals 88 extending upwardly from connector 86 to facilitate welding to bus bars or similar connectors of an ECU (electronic control unit). In order to avoid the possibility of bending the unsupported elongated portion 88a during assembly of the transducer, shipping and handling, a shroud 96 is provided. Shroud 96 has a body portion 96a formed with longitudinally extending channels 96b located about the outer peripheral portion of the body to be in alignment with terminal portions 88a. The channels can be formed as bores as shown in FIGS. 13(b), 13(c) or, if desired, they could be formed as open grooves. Shroud 96 is also formed with a downwardly extending, centrally located pin 96c which is receivable in a mating bore 86f of the connector and with a pair of spaced apart legs 96d extending downwardly from the outer peripheral portion of body 96a and receivable in longitudinally extending grooves 86g formed in the body 86b of the connector. The outer peripheral portion of body 96a may be formed with a longitudinally extending angular orientation flat 96e from which a third, wider orientation leg 96f extends and is receivable in a mating groove 86h on a mating flat surface 86k of connector 86. The at rest position of legs 96d, 96f may be formed so that they are inclined inwardly slightly as one goes from the body 96a out toward the free distal end so that they grasp onto the connector when the shroud is placed thereon while allowing easy removal. As shown in the drawings, a cut-out 96g is preferably formed at the top of shroud 96 to expose the top of each terminal 88 so that electrical contact can be made for testing without removal of the shroud.

Figure 14:
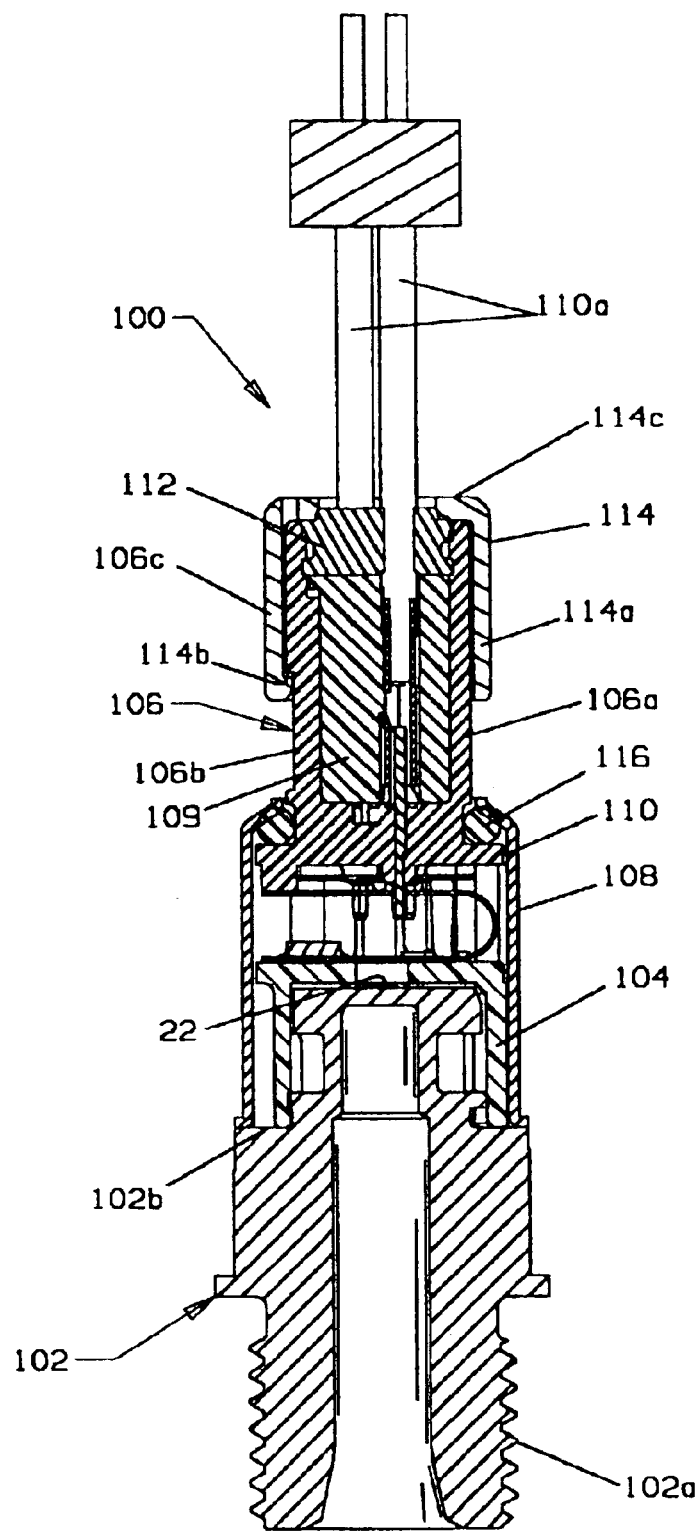
FIG. 14 is a longitudinal cross-sectional view of yet another modified pressure transducer particularly adapted for use in harsh environmental conditions.
Figure 14A:
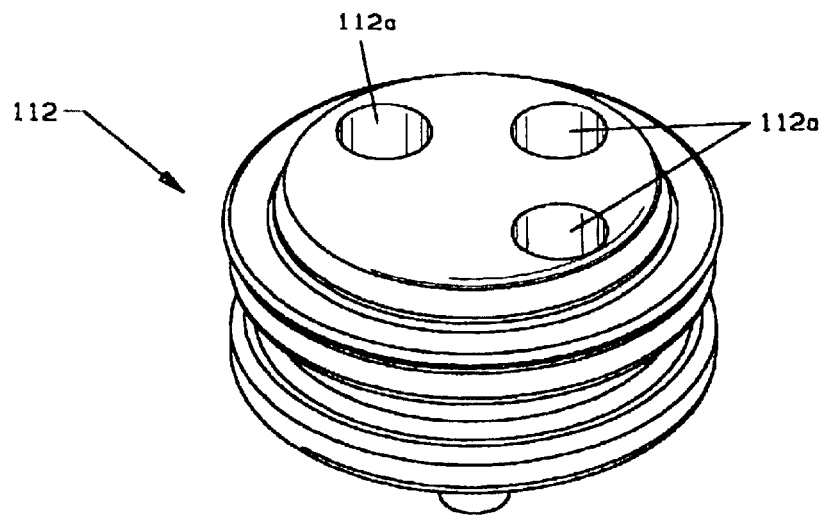
FIG. 14(a) is a perspective view of a sealing grommet of the FIG. 14 transducer.
Figure 14B:
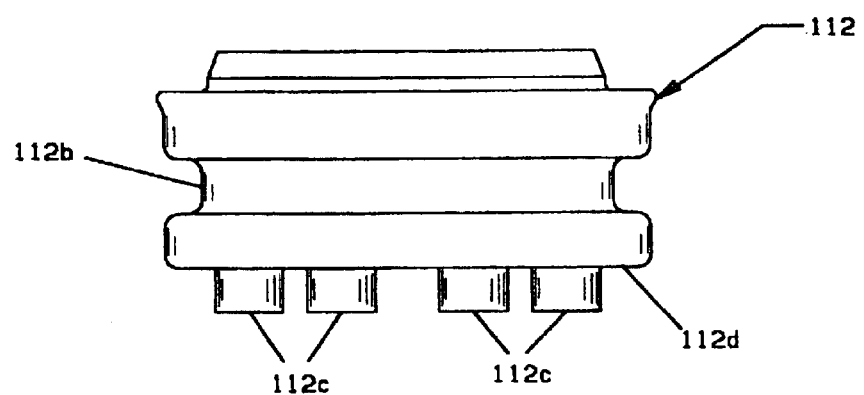
FIG. 14(b) is an elevational view of the FIG. 14(a) grommet.

The embodiment of FIGS. 14, 14(a), 14(b) is particularly adapted for use for applications in which the transducer is exposed to harsh environmental conditions. Transducer 100 is similar to that of FIG. 1 having a tubular fitting 102 provided with a threaded coupling end 102a as in the FIG. 1 embodiment. Support member 104 and housing 108 are both supported on an annular platform 102b. The wire bonds extending from sensor assembly 22 and the encapsulant are not shown for ease of illustration but are the same as in the above-described embodiments, as is the flexible circuit assembly. Connector 106 has an elongated tubular neck portion 106a forming a well in which is received a relatively rigid insert insulator 109 which is provided with bores to receive and retain receptacles for mating with respective terminals 110. The receptacles have a lead attachment portion and are attached to respective flexible lead wires 110a which in turn extend through and out of a grommet 112, also received in the well and supported by insert insulator 109. Grommet 112, also shown in FIGS. 14(a), 14(b) is a cylindrical body of resilient material such as rubber having through holes 112a for wire leads 110a connected to the terminals 110 through the receptacles, a circumferentially extending center groove or gland 112b and a plurality of spaced apart cylindrical protrusions 112c extending downwardly from the bottom face surface 112d. This structure provides optimum compression against both the wire leads and the connector. The cylindrical protrusions provide space relief to prevent over-compression. A snap cap 114 is used to retain the grommet in the well formed in connector neck 106a. Cap 114 is generally tubular but having longitudinally extending slots to provide stress relief and to define legs 114a formed with an inwardly extending catch 114b at the distal free end thereof. Snap cap 114 has an inwardly, radially extending flange or tabs 114c at its upper and so that when cap 114 is pushed onto tubular neck portion 106a of the connector, catch 114b is received in a recessed portion 106b of the connector and locked by the engagement of catch 114b with a retainer shoulder 106c at the upper end of the recessed portion. The inner portion of the recessed portion 106b can serve as a key which mates with a corresponding keyway in the outer surface of insert insulator 109 to provide an orientation feature to prevent it from being inserted into the connector in the wrong orientation. The use of flexible wire leads results in a device which can accommodate different orientations. As in the other above described embodiments, O-ring 116 is used to seal the opposite end of connector 106 in conjunction with housing 108 as well as to provide compressive force against the sensor components holding them in place.

Although the invention has been described with regard to specific preferred embodiments thereof, variations and modifications will become apparent to those skilled in the art. It is, therefore, the intention that the appended claims be interpreted as broadly as possible in view of the prior art to include all such variations and modifications.

What is claimed:

1. A condition responsive transducer comprising
a body formed with a diaphragm,
a condition responsive sensor mounted on the diaphragm,
a support member mounted on the body, the support member having a wall overlying the diaphragm and formed with an opening in the wall aligned with the condition responsive sensor, spaced apart catch retainer surfaces formed on the support member,
a flexible circuit having first and second portions bent into a generally U-shaped configuration with the second portion extending over the first portion, the first portion bonded to the wall overlying the diaphragm adjacent to the opening, the condition responsive sensor electrically connected to the first portion of the flexible circuit,
a plurality of elongated electrically conductive terminals,
a connector formed of electrically insulating material mounting the terminals in spaced apart relation to one another, a portion of the terminals extending through the connector and being connected to the second portion of the flexible circuit,
an electrically conductive EMC shield attached to the connector and having an end wall disposed between the connector and the second portion of the flexible circuit, at least two spaced apart legs extending downwardly from the EMC shield, each leg formed with a laterally extending catch portion and being attached to the catch retainer surfaces on the support member.

2. A condition responsive transducer according to claim 1 in which the connector has sidewalls formed with slots and the EMC shield has a pair of flared spring tabs extending from the end wall adjacent each leg, each pair of tabs receivable in a respective slot of the connector and being biased against opposite surfaces forming the slots to attach the EMC shield to the connector.

3. A condition responsive transducer according to claim 1 in which the support member has a sidewall and the catch retainer surfaces are formed in the sidewall.

4. A condition responsive transducer according to claim 1 further comprising at least another leg extending downwardly from the EMC shield, the at least another leg having an elongated portion lying generally in a plane and having a distal end foot bent out of the plane and being biased against a selected portion of the flexible circuit when the catch portions are engaged with the catch retainer surfaces.

5. A condition responsive transducer according to claim 1 in which the connector has a bottom surface formed with a plurality of terminal receiving bosses extending downwardly from the bottom surface and the end wall of the EMC shield is formed with a plurality of terminal receiving apertures, the bosses extending through the terminal receiving apertures.

6. A condition responsive transducer according to claim 1 in which the connector is generally cylindrical and an O-ring seat is formed on the connector and further comprising an O-ring disposed on the O-ring seat, a loading washer placed over the O-ring and a generally tubular metallic housing having a lower end and having inwardly extending, angularly spaced apart force applying surfaces is received circumscribing the connector with the lower end received on the body for attachment thereto and with the force applying surfaces engaging the loading washer and applying a compressive force to the O-ring as the housing is attached to the body to form an environmental seal as well as applying a compressive force on the connector and the support member.

7. A condition responsive transducer according to claim 6 further comprising at least another leg which extends from the EMC shield, the at least another leg having an elongated portion lying generally in a plane and having a distal end foot bent out of the plane and being biased against a selected portion of the flexible circuit by the compressive force on the O-ring.

8. A condition responsive transducer according to claim 6 in which the connector is formed of two separate portions, the first connector portion having a centrally disposed tubular portion defining a cavity having a closed end, the O-ring seat formed outside of the tubular portion and the second connector portion having a hub receivable in the cavity and an end wall extending radially beyond the tubular portion when the hub is received in the cavity, the end wall serving to retain the loading washer and O-ring on the first connector portion prior to the attachment of the housing to the body.

9. A condition responsive transducer according to claim 8 in which the end wall of the second connector portion is formed with an outer periphery having cut-out portions angularly alignable with the force applying surfaces of the housing, the cut-outs configured to allow the force applying surfaces to pass beyond the end wall and into engagement with the loading washer.

* * * * *